(12) United States Patent
Stocco et al.

(10) Patent No.: US 8,591,345 B2
(45) Date of Patent: Nov. 26, 2013

(54) FLEXIBLE DIAPHRAGM COUPLING FOR AXIAL FORCE LOADING

(75) Inventors: Joseph A. Stocco, Liverpool, NY (US); Benjamin G. Morczek, Constableville, NY (US)

(73) Assignee: Goodrich Corporation, Charlotte, NC (US)

( * ) Notice: Subject to any disclaimer, the term of this patent is extended or adjusted under 35 U.S.C. 154(b) by 0 days.

(21) Appl. No.: 13/589,637

(22) Filed: Aug. 20, 2012

(65) Prior Publication Data

US 2013/0065696 A1 Mar. 14, 2013

Related U.S. Application Data

(60) Provisional application No. 61/532,653, filed on Sep. 9, 2011.

(51) Int. Cl.
*F16D 3/79* (2006.01)
(52) U.S. Cl.
USPC .......................................................... 464/99
(58) Field of Classification Search
USPC .................................. 464/79, 80, 98, 99, 181
See application file for complete search history.

(56) References Cited

U.S. PATENT DOCUMENTS

| | | | | |
|---|---|---|---|---|
| 3,543,537 A | * | 12/1970 | Brady et al. | 464/99 |
| 4,120,175 A | | 10/1978 | Dernedde | |
| 4,133,188 A | * | 1/1979 | Cartwright | 464/99 |
| 4,276,758 A | * | 7/1981 | Coman et al. | |
| 4,802,882 A | * | 2/1989 | Heidrich | 464/99 |
| 5,000,722 A | * | 3/1991 | Zilberman | 464/79 |
| 5,158,504 A | | 10/1992 | Stocco | |
| 5,364,309 A | * | 11/1994 | Heidrich et al. | 464/99 |
| 5,899,813 A | * | 5/1999 | Bunce | 464/99 |

(Continued)

FOREIGN PATENT DOCUMENTS

| | | |
|---|---|---|
| DE | 2542946 A1 | 3/1977 |
| EP | 0211090 A1 | 2/1987 |
| EP | 1972810 A2 | 9/2008 |
| EP | 2019220 A1 | 1/2009 |

OTHER PUBLICATIONS

Communication from European Patent Office pursuant to Article 94(3) EPC dated Aug. 9, 2013 in European Patent Application No. 12 183 470.9.

(Continued)

*Primary Examiner* — Gregory Binda
*Assistant Examiner* — Josh Skroupa
(74) *Attorney, Agent, or Firm* — Edwards Wildman Palmer LLP; Scott D. Wofsy; Christopher Cillie

(57) ABSTRACT

A flexible diaphragm coupling is disclosed which includes a radially inner hub portion, a radially outer rim portion, and a flexible diaphragm portion extending between the radially outer rim portion and the radially inner hub portion. The flexible diaphragm portion includes a radially inner diaphragm section having a maximum axial thickness adjacent the radially inner hub portion and a radially outwardly tapering axial thickness extending to a point of minimum axial thickness of the diaphragm portion, and a radially outer diaphragm section having a maximum axial thickness adjacent the radially outer rim portion and a radially inwardly tapering axial thickness extending to the point of minimum axial thickness of the diaphragm portion. By design, the point of minimum axial thickness of the diaphragm portion is closer to the radially outer rim portion than to the radially inner hub portion.

10 Claims, 2 Drawing Sheets

(56) References Cited

U.S. PATENT DOCUMENTS

| | | | |
|---|---|---|---|
| 7,618,326 B2* | 11/2009 | Mermoz | 464/98 |
| 2007/0049379 A1* | 3/2007 | Faass et al. | 464/79 |
| 2008/0232730 A1 | 9/2008 | Mathis | |
| 2009/0029782 A1* | 1/2009 | Durand et al. | |

OTHER PUBLICATIONS

Communication from European Patent Office of European search report dated Jul. 26, 2013 in European Patent Application No. 12183470.9.

* cited by examiner

FLEXIBLE DIAPHRAGM COUPLING FOR AXIAL FORCE LOADING

CROSS-REFERENCE TO RELATED APPLICATION

The subject application claims the benefit of priority to U.S. Provisional Patent Application Ser. No. 61/532,653, filed Sep. 9, 2011, which is herein incorporated by reference in its entirety.

BACKGROUND OF THE INVENTION

1. Field of the Invention

The subject invention is directed to flexible couplings, and more particularly to a flexible diaphragm coupling for rotating shaft components, which is configured to tolerate axial forces and the axial bending stress distribution associated therewith.

2. Description of Related Art

Flexible couplings for connecting two rotating shafts to one another, to transmit torque while accommodating axial and/or angular misalignment of the shafts have been used in aerospace applications for many years. These devices often use one or more contoured diaphragms welded or otherwise secured together to form a flexible coupling mounted between driving and driven shaft components.

For example, commonly assigned U.S. Pat. No. 5,158,504 to Stocco describes a coupling having plural contoured diaphragms welded together to form a flexible connection between a driving shaft and a driven shaft. Those prior art diaphragms were configured to accommodate large axial deflections without over-stressing the diaphragm material. They were contoured to be thinnest in a location midway between their hub and rim, where the bending moment developed by axial deflections was determined to be smallest. This ensured that stress levels would be minimized throughout the diaphragm. The diaphragm profile disclosed in U.S. Pat. No. 5,158,504 has been employed with great success for many years in a variety of aerospace shaft coupling applications.

Recently, aerospace shaft coupling applications have arisen with new and different loading requirements than contemplated in U.S. Pat. No. 5,158,504. In particular, there has now become a need in the art for a contoured diaphragm element that can tolerate both linear and nonlinear deflections produced by axial force loading. More particularly, in addition to tolerating a first restorative force generated by the linear axial spring rate of the diaphragm, as contemplated in U.S. Pat. No. 5,158,504, the new diaphragm profile must also tolerate a second restorative force involving cubic non-linear membrane stresses generated when the axial load stretches the diaphragm in a radial direction. This design requirement was neither contemplated nor appreciated in U.S. Pat. No. 5,158,504.

SUMMARY OF THE INVENTION

The subject invention is directed to a new and useful flexible diaphragm coupling for supporting rotating shaft couplings, which is adapted and configured to accommodate a total axial force load and the axial bending stress distributions associated therewith. More particularly, the geometric configuration of the diaphragm coupling of the subject invention is optimized to accommodate the stress distribution associated with linear and cubic non-linear restorative spring forces generated by an axially applied load.

The novel diaphragm coupling includes a radially inner hub portion defining a central axis, a radially outer rim portion, and a flexible diaphragm portion that extends between the radially outer rim portion and the radially inner hub portion. The flexible diaphragm portion includes a radially inner diaphragm section having a maximum axial thickness adjacent the radially inner hub portion and a radially outwardly tapering axial thickness extending to a point of minimum axial thickness of the diaphragm portion, and a radially outer diaphragm section having a maximum axial thickness adjacent the radially outer rim portion and a radially inwardly tapering axial thickness extending to the point of minimum axial thickness of the diaphragm portion.

In accordance with a preferred embodiment of the subject invention, the point of minimum axial thickness of the diaphragm portion is closer to the radially outer rim portion than to the radially inner hub portion. Preferably, the maximum axial thickness of the radially inner diaphragm section is greater than the maximum axial thickness of the radially outer diaphragm section. The diaphragm portion includes axially opposed first and second side surfaces. In one embodiment of the invention, the first side surface of the diaphragm portion is contoured and the second side surface is planar. In an alternative embodiment, the first and second side surfaces of the diaphragm portion are contoured.

It is envisioned that the diaphragm coupling is formed integral with another flexible element. The flexible element may be selected from a group consisting of a spline, a bolted flange or another flexible diaphragm. The flexible element may be connected to the radially outer rim portion of the diaphragm coupling, or to the radially inner hub portion of the diaphragm coupling.

The subject invention is also directed to a flexible diaphragm coupling assembly, which includes a plurality of annular diaphragm elements arranged in axially spaced relationship on a common axis to provide a flexible junction between first and second rotating shaft components. It is envisioned that the coupling assembly can include as few as two annular diaphragm elements and as many as eight or more annular diaphragm elements.

Each diaphragm element in the coupling assembly includes a flexible diaphragm portion extending between a radially outer rim portion and a radially inner hub portion. The flexible diaphragm portion includes a radially inner diaphragm section having a maximum axial thickness adjacent the radially inner hub portion and a radially outwardly tapering axial thickness extending to a point of minimum axial thickness of the diaphragm portion, and a radially outer diaphragm section having a maximum axial thickness adjacent the radially outer rim portion and a radially inwardly tapering axial. The assembly further includes a first flange portion for mating with the first shaft component and a second flange portion for mating with the second shaft component.

The maximum axial thickness of the radially inner diaphragm section is greater than the maximum axial thickness of the radially outer diaphragm section. The diaphragm portion includes axially opposed side surfaces, wherein one side surface is contoured and the other side surface is planar.

In one embodiment of the subject invention, the coupling assembly includes four axially aligned flexible diaphragm elements, including first through fourth diaphragm elements. More particularly, the coupling assembly includes two inverted pairs of axially aligned flexible diaphragm elements, wherein the first and second diaphragm elements are aligned so that the contoured surfaces thereof face toward the first flange portion, while the third and fourth diaphragm elements are arranged so that the contoured surfaces thereof face toward the second flange portion.

These and other features of the diaphragm coupling element of the subject invention and the manner in which it is manufactured and employed will become more readily apparent to those having ordinary skill in the art from the following enabling description of the preferred embodiments of the subject invention taken in conjunction with the several drawings described below.

BRIEF DESCRIPTION OF THE DRAWINGS

So that those skilled in the art to which the subject invention appertains will readily understand how to make and use the flexible diaphragm coupling element of the subject invention without undue experimentation, preferred embodiments thereof will be described in detail hereinbelow with reference to certain figures, wherein.

DETAILED DESCRIPTION OF PREFERRED EMBODIMENTS

Figure 1A:
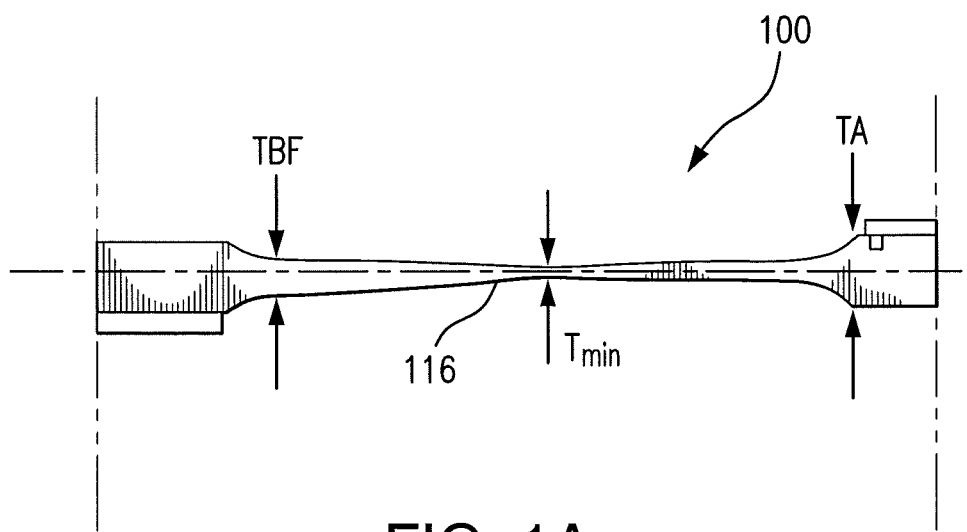
FIG. 1A is a partial cross-sectional view of a prior art diaphragm coupling element constructed in accordance with commonly assigned U.S. Pat. No. 5,158,504.
Figure 1B:
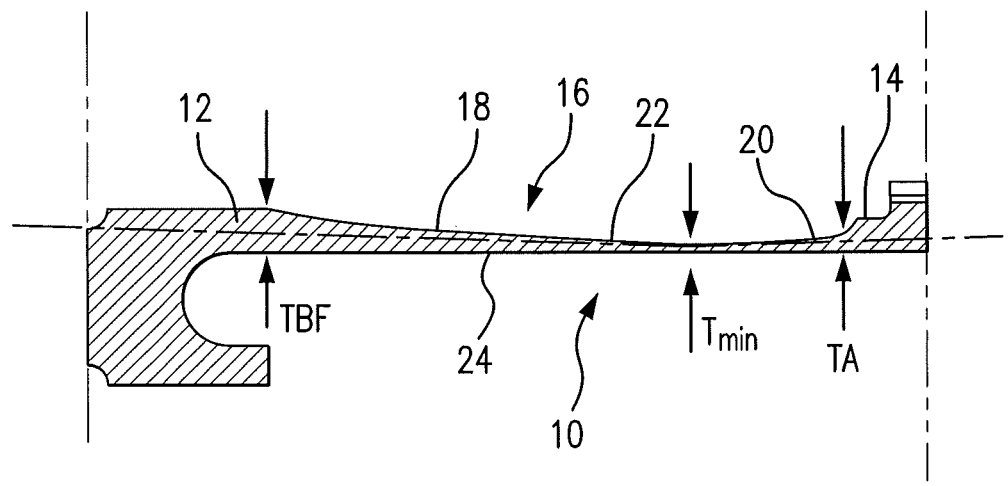
FIG. 1B is a partial cross-sectional view of diaphragm coupling element configured in accordance with a preferred embodiment of the subject invention.

Referring now to the drawings wherein like reference numerals identify similar features or elements of the various embodiments of the subject invention disclosed herein, there is illustrated in FIG. 1B a flexible diaphragm element constructed in accordance with a preferred embodiment of the subject invention and designated generally by reference numeral 10. Diaphragm element 10 includes a radially inner annular hub portion 12, a radially outer annular rim portion 14, and a flexible diaphragm portion 16 that extends between the radially outer rim portion 14 and the radially inner hub portion 12.

The flexible diaphragm portion 16 includes a radially inner diaphragm section 18 having a maximum axial thickness TBF adjacent the radially inner hub portion 12 and a radially outwardly tapering axial thickness extending to a point of minimum axial thickness $T_{min}$ of the diaphragm portion 16. The flexible diaphragm portion 16 further includes a radially outer diaphragm section 20 having a maximum axial thickness TA adjacent the radially outer rim portion 14 and a radially inwardly tapering axial thickness extending to the point of minimum axial thickness $T_{min}$ of the diaphragm portion 16.

To accommodate axial forces in an optimal manner, it has been determined through analytical mathematics that the maximum axial thickness TBF adjacent the radially inner hub portion 12 should be 2.86 times the maximum axial thickness TA adjacent the radially outer rim portion 14. It has also been determined through analytical mathematics that the point of minimum axial thickness $T_{min}$ of the diaphragm portion 16 must be closer to the radially outer rim portion 14 than to the radially inner hub portion 12, to best accommodate the stress distribution resulting from axial loading. It is envisioned that the proximity of the point of minimum axial thickness $T_{min}$ to the radially outer rim portion 14 could vary within a range of about 20%, while maintaining the requisite stiffness characteristics of the diaphragm element. Furthermore, the contoured profile of the diaphragm element 10 accounts for the torque transmission requirements and buckling stability of the coupling.

The diaphragm portion 16 includes axially opposed first and second side surfaces 22, 24. In one embodiment of the subject invention, the first side surface 22 is contoured and the second side surface 24 is planar. In an alternative embodiment, both the first side surface and the second side surface of the diaphragm element can be contoured.

Referring to FIG. 1A, in contrast to the novel diaphragm coupling element 10 of the subject invention, the prior art diaphragm coupling element 100 includes a contoured diaphragm section 116 with a point of minimum axial thickness $T_{min}$ located at the midpoint of the diaphragm portion 116. As discussed above, the geometric profile of the prior art coupling element 100 does not account for linear and nonlinear deflections produced by axial force loading.

To accommodate axial forces in an optimal manner, it has been determined through analytical mathematics that the taper thickness ratio (TBF/TA) of the diaphragm coupling element 10 of the subject invention should increase by at least about 10% relative to the taper thickness ratio of the prior art diaphragm coupling 100. Therefore, if the taper thickness ratio of the prior art diaphragm coupling element 100 is about 1.00, then the taper thickness ratio for the diaphragm coupling element 10 of the subject invention would be about 1.10.

It is envisioned that the diaphragm coupling element 10 of the subject invention can be formed integral with another flexible element. The flexible element can be selected from a group consisting of a spline, a bolted flange or another flexible diaphragm element 10. It is further envisioned that the other flexible element can be connected to the radially outer rim portion of the diaphragm coupling, or to the radially inner hub portion of the diaphragm coupling, depending upon the type of shaft components and/or application with which the coupling is employed.

Figure 2:
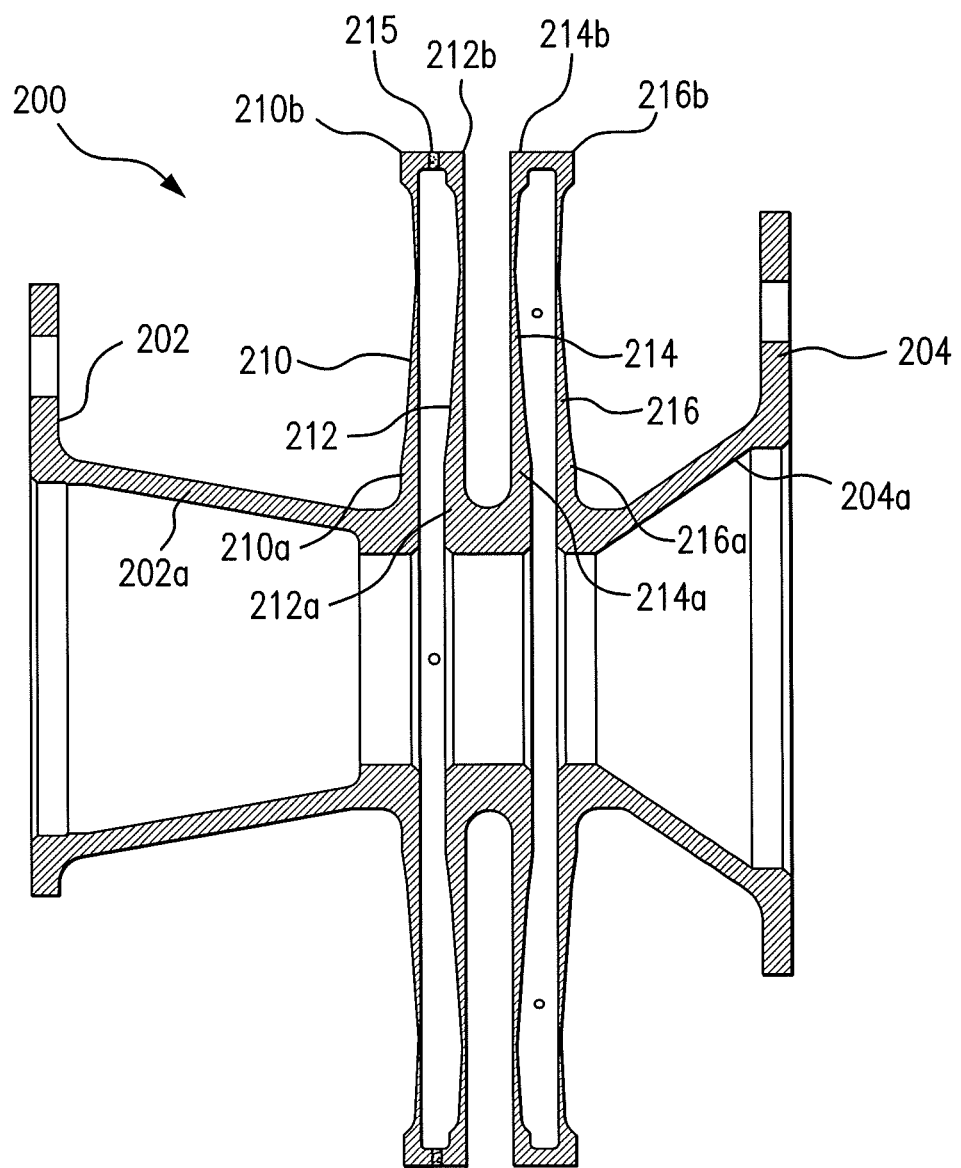
FIG. 2 is a cross-sectional view of a flexible coupling assembly that includes an arrangement of four axially aligned interconnected diaphragm coupling elements constructed in accordance with a preferred embodiment of the subject invention.

By way of example, FIG. 2 illustrates a diaphragm coupling assembly designated generally by reference numeral 200 in which a plurality of flexible diaphragm coupling elements constructed in accordance with subject invention are employed to provide a flexible junction between two rotating drive shaft components. The coupling assembly 200 includes a first flange portion 202 for mating with a first shaft component (not shown) and a second flange portion 204 for mating with a second shaft component (not shown). The first and second flange portions 202, 204 are connected to one another by four axially aligned flexible diaphragm coupling elements, including a first flexible diaphragm element 210, a second flexible diaphragm element 212, a third flexible diaphragm element 214 and a fourth flexible diaphragm element 216.

Coupling assembly 200 includes two inverted pairs of axially aligned diaphragm elements. That is, the first and second diaphragm elements 210 and 212 are aligned so that the countered surfaces thereof face toward the first flange portion 202, while the third and fourth diaphragm elements are arranged so that the contoured surfaces thereof face toward the second flange portion 204.

With continuing reference to FIG. 2, the hub portion 210a of the first diaphragm element 210 is formed integral with the body 202a of the first flange portion 202, so no weld is required therebetween. The rim portion 210b of the first diaphragm element 210 is welded to the rim portion 212b of the second diaphragm element 212 at intermediate weld point 215. The hub portion 212a of the second diaphragm element 212 is formed integral with the hub portion 214a of the third diaphragm element 214, thus no weld is required therebetween. The rim portion 214b of the third diaphragm element 214 is formed integral with the rim portion 216b of the fourth diaphragm element 216, so no weld is required therebetween. Finally, the hub portion 216a of the fourth diaphragm element 216 is formed integral with the body 204a of the second flange portion 204, so no weld is required therebetween.

Those skilled in the art should readily appreciate that the coupling assembly 200 is merely an illustrative embodiment of the subject invention, and it should not be construed as limiting the subject disclosure in any way in terms of the number and orientation of flexible diaphragms employed therein. Moreover, it is envisioned that the number of flexible diaphragm elements employed in a particular coupling assembly and the relative arrangement of those flexible coupling elements can and will vary depending upon the application or system within which the coupling assembly is employed. Indeed, it is envisioned and well within the scope of the subject disclosure, that a coupling assembly built in accordance with a preferred embodiment of the subject invention can have as few as two flexible diaphragm elements and as many as eight or more flexible diaphragm elements.

The unique contoured surface profile of the flexible diaphragm element 10 of the subject invention is preferably machined from a single piece of metallic bar stock or from a forging. To accomplish this complex machining task, the initial work piece is held in multiple planes. More particularly, the work piece is supported on a first plane corresponding to the radially outer rim portion 14 of the diaphragm element, on a second plane corresponding to the radially inner hub portion 12 of the diaphragm element and on a third plane corresponding to the planar side surface 24 of the diaphragm element. To achieve this multi-plane holding, the outer diameter of the work piece, the inner diameter of the work piece and the planar side surface of the work piece are supported by appropriate fixtures.

While the subject invention has been shown and described with reference to preferred embodiments, those skilled in the art will readily appreciate that various changes and/or modifications may be made thereto without departing from the spirit and scope of the subject invention as defined by the appended claims.

What is claimed is:

1. A flexible diaphragm coupling assembly, comprising:
a) first and second annular diaphragm elements arranged in an axially spaced relationship on a common axis to provide a flexible junction, each diaphragm element including a flexible diaphragm portion extending between a radially outer rim portion and a radially inner hub portion, the outer rim portions of the first and second annular diaphragm elements being coupled together, the flexible diaphragm portion including:
   i) a radially inner diaphragm section having a maximum axial thickness adjacent the radially inner hub portion and a radially outwardly tapering axial thickness extending to a point of minimum axial thickness of the diaphragm portion;
   ii) a radially outer diaphragm section having a maximum axial thickness adjacent the radially outer rim portion and a radially inwardly tapering axial thickness extending to the point of minimum axial thickness of the diaphragm portion;
   iii) a contoured side surface extending between the inner hub portion and outer rim portion; and
   iv) a planar side surface axially opposed to the contoured side surface,
b) a first flange portion coupled to the first annular diaphragm element; and
c) a second flange portion coupled to the second annular diaphragm element,
wherein the respective contoured faces of the first and second annular diaphragm elements each face in the same axial direction.

2. A flexible diaphragm coupling assembly as recited in claim 1, wherein the maximum axial thickness of the radially inner diaphragm section of each diaphragm element is greater than the maximum axial thickness of the radially outer diaphragm section thereof.

3. A flexible diaphragm coupling assembly as recited in claim 1, further comprising third and fourth axially aligned flexible diaphragm elements coupled between the second flexible diaphragm element and the second flange portion.

4. A flexible diaphragm coupling assembly as recited in claim 3, wherein the third and fourth diaphragm elements are coupled at their outer rim portions, and wherein the contoured faces of the third and fourth diaphragm elements each face in the same axial direction such that the first and second diaphragm elements and third and fourth diaphragm elements form inverted pairs of axially aligned diaphragm elements.

5. A flexible diaphragm coupling assembly as recited in claim 3, wherein the outer rim portion of the third diaphragm element is formed integral with the outer rim portion of the fourth diaphragm element.

6. A flexible diaphragm coupling assembly as recited in claim 1, wherein the coupling assembly includes as few as two and as many as eight axially aligned flexible diaphragm elements.

7. A flexible diaphragm coupling assembly as recited in claim 1, wherein a radial position of the point of minimal axial thickness is selected to accommodate a total axial force load and axial bending stress distribution associated therewith on the flexible diaphragm assembly.

8. A flexible diaphragm coupling assembly as recited in claim 1, wherein proximity of the point of minimum axial thickness to the radially outer rim portion varies within a range of about 20% for each flexible diaphragm element.

9. A flexible diaphragm coupling assembly as recited in claim 1, wherein the maximum axial thickness of the radially inner diaphragm section is about 2.86 times the maximum axial thickness of the radially outer diaphragm section for each flexible diaphragm element.

10. A flexible diaphragm coupling assembly as recited in claim 1, wherein the outer rim portion of the first diaphragm element is coupled to the outer rim portion of the second diaphragm element at an intermediate weld point.

* * * * *